(12) United States Patent
Ruhlander

(10) Patent No.: US 8,245,379 B2
(45) Date of Patent: Aug. 21, 2012

(54) SNAP-TOGETHER, TWO-PIECE GUIDE TUBE FOR A PUSH-PULL CABLE ASSEMBLY

(75) Inventor: Gregory Phillip Ruhlander, Hannibal, MO (US)

(73) Assignee: Dura Global Technologies, LLC, Auburn Hills, MI (US)

( * ) Notice: Subject to any disclaimer, the term of this patent is extended or adjusted under 35 U.S.C. 154(b) by 1334 days.

(21) Appl. No.: 11/923,223

(22) Filed: Oct. 24, 2007

(65) Prior Publication Data

US 2009/0107286 A1    Apr. 30, 2009

(51) Int. Cl.
B23P 11/00    (2006.01)

(52) U.S. Cl. ............. 29/434; 29/460; 29/453; 29/527.1; 74/502.5; 74/502.4; 74/502.6; 74/500.5; 74/501.5 R

(58) Field of Classification Search ................. 74/502.4, 74/502.5, 502.6, 500.5, 501.5 R; 29/434, 29/428, 460, 527.1, 527.2, 453
See application file for complete search history.

(56) References Cited

U.S. PATENT DOCUMENTS

| | | | | |
|---|---|---|---|---|
| 2,338,524 | A * | 1/1944 | McCabe | 264/263 |
| 4,092,396 | A * | 5/1978 | McCartney et al. | 264/249 |
| 4,238,974 | A | 12/1980 | Fawcett | |
| 4,452,097 | A * | 6/1984 | Sunkel | 74/502.4 |
| 4,649,010 | A | 3/1987 | Bennett et al. | |
| 4,726,251 | A * | 2/1988 | Niskanen | 74/502 |
| 5,448,926 | A * | 9/1995 | Reasoner | 74/500.5 |
| 5,823,063 | A * | 10/1998 | Nagle et al. | 74/502.6 |
| 5,862,580 | A | 1/1999 | Pretuccello et al. | |
| RE36,722 | E * | 6/2000 | Reasoner | 74/500.5 |
| 6,105,232 | A * | 8/2000 | Malone et al. | 29/434 |
| 6,119,543 | A * | 9/2000 | Webb | 74/502.4 |
| 6,185,806 | B1 * | 2/2001 | Malone et al. | 29/434 |
| 6,308,393 | B1 * | 10/2001 | Haynes et al. | 29/434 |
| 6,308,395 | B1 * | 10/2001 | Webb | 29/453 |
| 6,814,189 | B2 * | 11/2004 | Mai et al. | 188/2 D |
| 7,353,728 | B2 * | 4/2008 | Ruhlander et al. | 74/502 |
| 7,866,024 | B2 * | 1/2011 | Gordy et al. | 29/434 |
| 2001/0013261 | A1 * | 8/2001 | Murg | 74/502.5 |
| 2001/0029804 | A1 * | 10/2001 | Meyer | 74/502.4 |
| 2002/0104402 | A1 * | 8/2002 | Ruhlander | 74/502.4 |
| 2004/0255712 | A1 * | 12/2004 | Ruhlander | 74/502.4 |
| 2009/0056099 | A1 | 3/2009 | Gordy et al. | |
| 2009/0056494 | A1 | 3/2009 | Gordy et al. | |
| 2009/0107285 | A1 * | 4/2009 | Gordy | 74/502.4 |
| 2010/0064840 | A1 | 3/2010 | Gordy et al. | |

* cited by examiner

*Primary Examiner* — David Bryant
*Assistant Examiner* — Bayan Salone
(74) *Attorney, Agent, or Firm* — Porter, Wright, Morris & Arthur, LLP; Richard M. Mescher; Dean B. Watson

(57) ABSTRACT

A cable assembly includes a cable having a conduit and a core longitudinally movable within the conduit, a core attachment secured to an end of the core, a conduit abutment fitting secured to an end of the conduit, and a guide tube extending from the conduit abutment fitting and slidably receiving the core attachment therein. The guide tube includes a main member secured to the conduit abutment fitting and an extension member longitudinally extending from the main portion such that the core attachment is slidably received in both the main portion and the extension portion. An end of the core attachment is located within the guide tube over an entire stroke of the core attachment. The extension member is longitudinally separable from the main member to expose the end of the core attachment during assembly so that the end of the core attachment can be secured to the core.

6 Claims, 3 Drawing Sheets

SNAP-TOGETHER, TWO-PIECE GUIDE TUBE FOR A PUSH-PULL CABLE ASSEMBLY

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the invention generally relates to a motion-transmitting cable assemblies and, more particularly, to such cable assemblies having guide tubes.

BACKGROUND OF THE INVENTION

Motion-transmitting control cable assemblies, sometimes referred to as "Bowden cables" or "push-pull cables," are used for transmitting both force and travel along a path in aircraft, automotive, and marine environments. These cable assemblies can be used for transmitting force and motion in push/pull type applications. One example of a specific use of such remote control cable assemblies is connecting shifters to automatic transmissions in automobiles.

A motion-transmitting remote control cable assembly typically includes a flexible core slidably enclosed within a flexible outer sheath or conduit. The core is adapted at one end to be attached to a member to be controlled whereas the other end is attached to an actuator for longitudinally moving the core element within the outer sheath. The ends of the outer sheath are secured by conduit abutment fittings to support structures or abutment members. Typically, steel rods are crimped to ends of the core. Each steel rod typically has an over-molded terminal on the end of the rod which can be connected to the control member and the actuator. The rod end or core attachment is typically slidably received in a guide tube extending from the conduit abutment fitting with the core meeting the steel rod within the guide tube. Such a structure limits the available manufacturing and assembly methods for the cable assembly.

In the automobile industry, there is a never ending desire to simplify and/or speed up the assembly process. There is also a never ending desire to reduce cost and weight of components without negatively affecting performance. Accordingly, there is a need in the art for an improved cable assembly.

SUMMARY OF THE INVENTION

The present invention provides a cable assembly which addresses at least some of the above-noted problems of the related art. According to the present invention, a motion transmitting cable assembly comprises, in combination, a cable having a conduit and a core longitudinally movable within the conduit, a core attachment secured to an end of the core, a conduit abutment fitting secured to an end of the conduit and a guide tube extending from the conduit abutment fitting and slidably receiving the core attachment therein. The guide tube includes a main portion secured to the conduit abutment fitting and an extension portion secured to and longitudinally extending from the main portion opposite the conduit abutment fitting such that the core attachment is slidably received in both the main portion and the extension portion.

According to another embodiment of the present invention, a motion transmitting cable assembly comprises, in combination, a cable having a conduit and a core longitudinally movable within the conduit, a core attachment secured to an end of the core, a conduit abutment fitting secured to an end of the conduit, and a guide tube extending from the conduit abutment fitting and slidably receiving the core attachment therein. The guide tube includes a main portion secured to the conduit abutment fitting and an extension portion secured to and longitudinally extending from the main portion opposite the conduit abutment fitting such that the core attachment is slidably received in both the main portion and the extension portion. An end of the core attachment is located within the guide tube over an entire stroke of the core attachment. The extension portion is longitudinally separable from the main portion to expose the end of the core attachment so that the end of the core attachment can be secured to the core.

According to yet another embodiment of the present invention, a method of assembling a motion transmitting cable assembly comprises the steps of, in combination, securing an end of a conduit to a conduit abutment fitting, providing a guide tube comprising a main member secured to the conduit abutment fitting and a separate extension member for longitudinally extending from the main portion opposite the conduit abutment fitting, extending a core attachment into a guide tube, extending a core attachment into the extension portion of the guide tube, extending a core through the conduit and into the main member of the guide tube, joining the core to the end of the core attachment, and securing the extension portion to the main portion to cover the joint between the core and the core attachment.

From the foregoing disclosure and the following more detailed description of various preferred embodiments it will be apparent to those skilled in the art that the present invention provides a significant advance in the technology of control cable assemblies. Particularly, the invention provides an easily manufactured, low cost and low weight assembly which maintains desired performance requirements. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
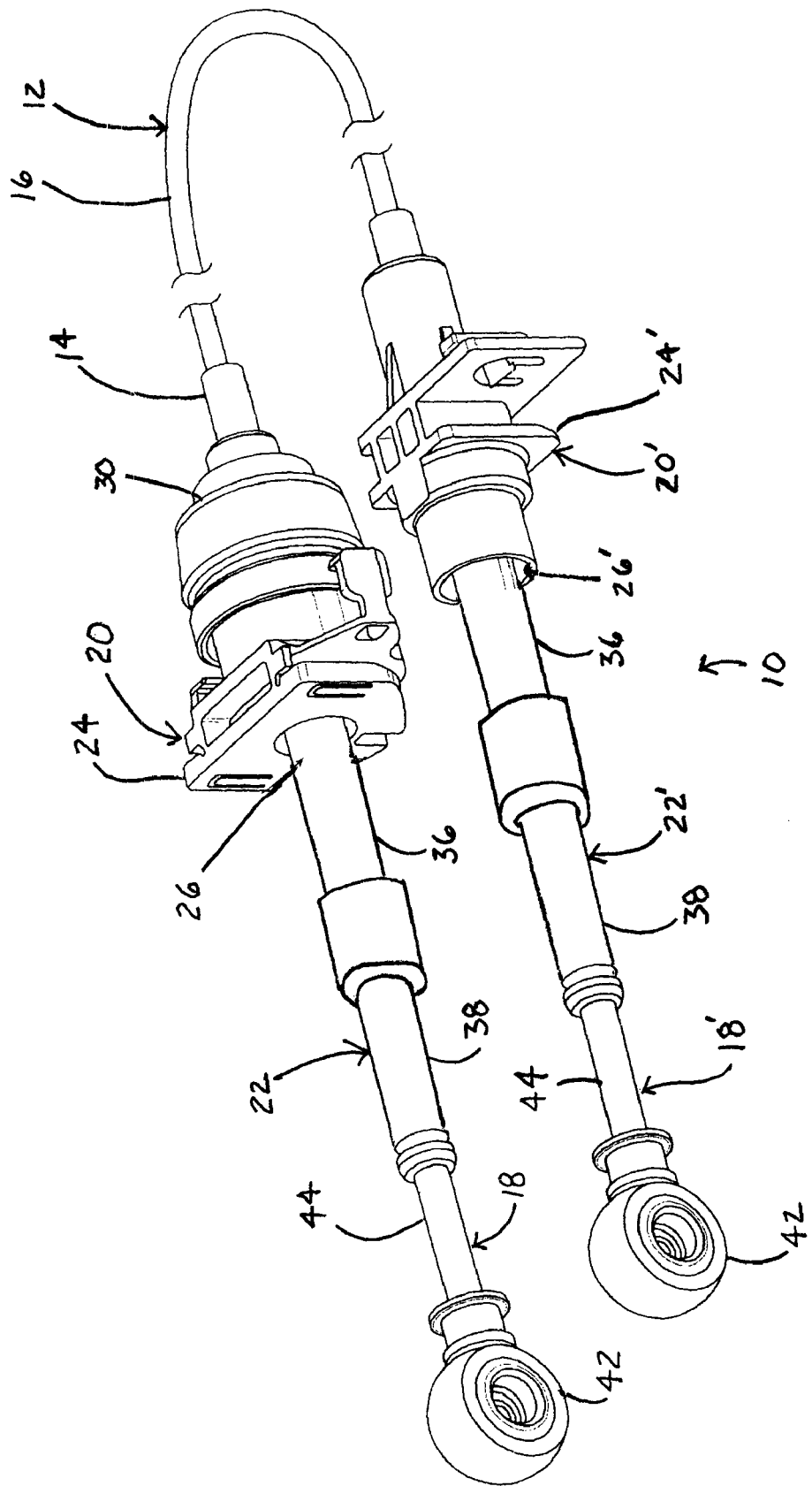
FIG. 1 is a perspective view of a push-pull cable assembly according a preferred embodiment of the present invention.

It should be understood that the appended drawings are not necessarily to scale, presenting a somewhat simplified representation of various preferred features illustrative of the basic principles of the invention. The specific design features of the cable assembly as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the cable assemblies illustrated in the drawings. In general, up or upward refers to an upward direction generally in the plane of the paper in FIGS. 1 and 17 and down or downward refers to a downward direction generally in the plane of the paper in FIG. 1. Also in general, fore or forward refers to a direction generally toward the left in the plane of the paper in FIG. 1, that is toward the end of the cable core, and aft or rearward refers to a direction generally toward the right in the plane of the paper in FIG. 1, that is away from the end of the cable core.

Detailed Description of Certain Embodiments

It will be apparent to those skilled in the art, that is, to those who have knowledge or experience in this area of technology, that many uses and design variations are possible for the motion-transmitting control cable assemblies disclosed herein. The following detailed discussion of various alternative and preferred embodiments will illustrate the general principles of the invention with reference to a push-pull cable assembly for use with a motor vehicle transmission system. Other embodiments suitable for other applications will be apparent to those skilled in the art given the benefit of this disclosure.

Referring now to the drawings, FIG. 1 shows a push-pull cable assembly 10 according to a preferred embodiment of the present invention which connects a transmission assembly to a shifter assembly of a motor vehicle, such as an automobile. While the illustrated embodiments of the present invention are particularly adapted for use with an automobile, it is noted that the present invention can be utilized with any motor vehicle having a control cable including trucks, buses, vans, recreational vehicles, earth moving equipment and the like, off road vehicles such as dune buggies and the like, air borne vehicles, and water borne vehicles. While the illustrated embodiments of the present invention are particularly adapted for use with a transmission system, it is also noted that the present invention can be utilized with other motor vehicle systems such as, for example, a parking brake, accelerator, hood release, brake release, trunk release, park lock, tilt wheel control, fuel filler door, and/or hydraulic control cables. While the illustrated embodiments of the present invention are particularly adapted for the transmission end of the cable, it is further noted that features of the present invention can be utilized at the shifter end of the cable.

Figure 2A:
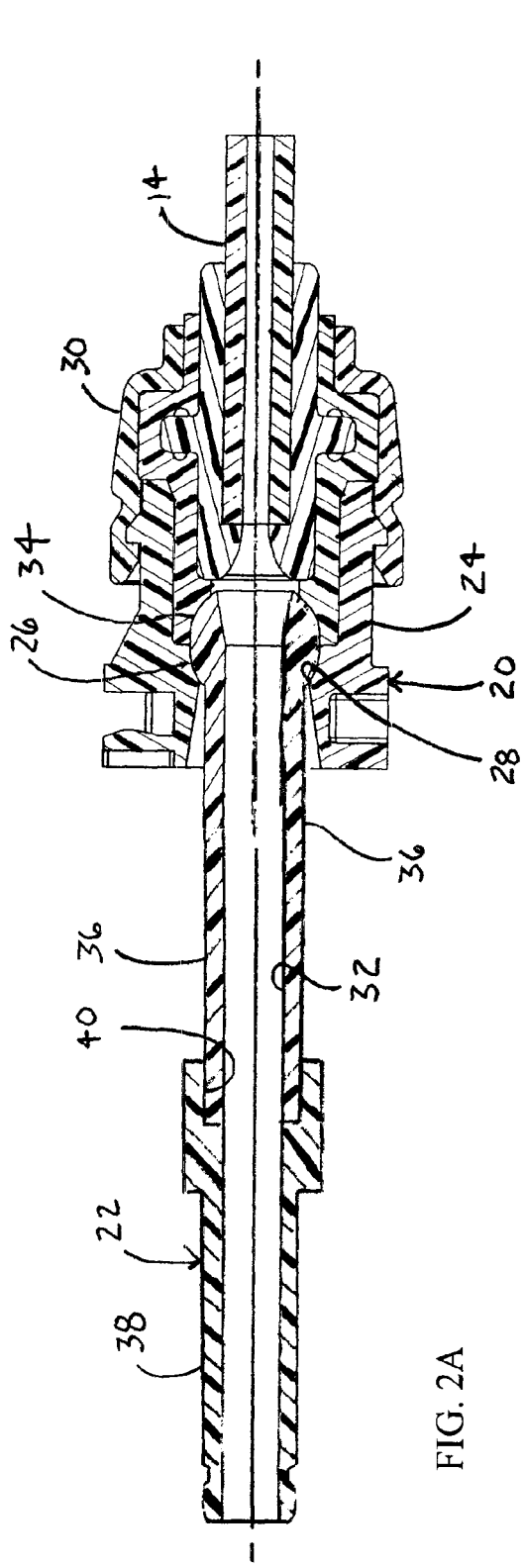
FIG. 2A is an enlarged cross-sectional view of a first end of the cable assembly of FIG. 1, wherein the core and core attachment are removed for clarity.
Figure 2B:
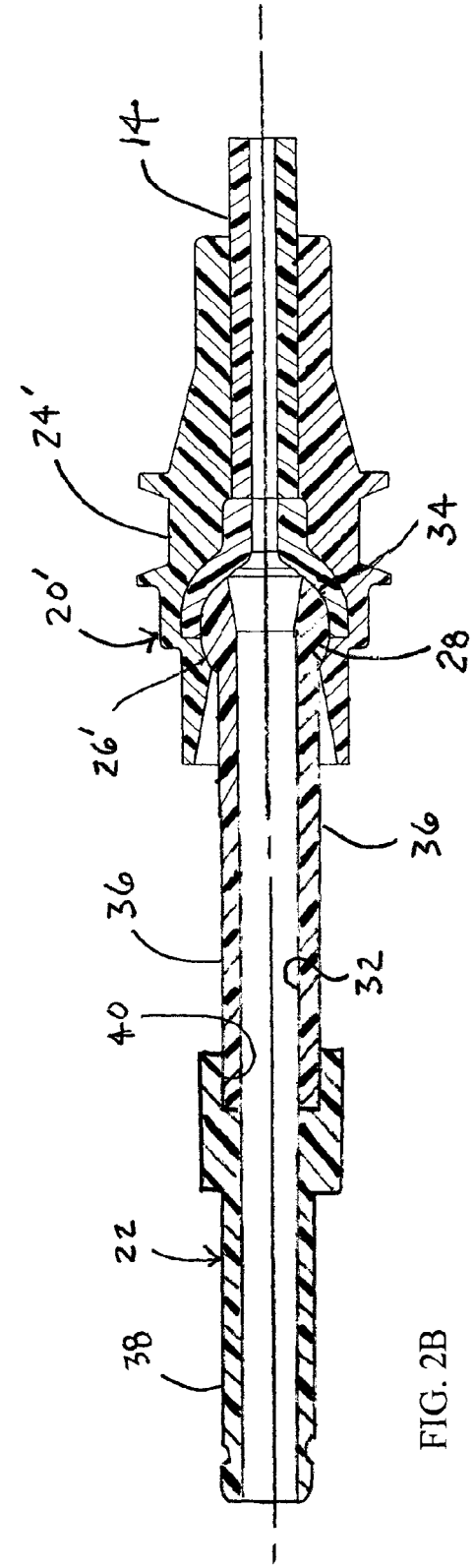
FIG. 2B is an enlarged cross-sectional view of a second end of the cable assembly of FIG. 1, wherein the core and core attachment are removed for clarity.

As best shown in FIGS. 1, 2A and 2B, the illustrated motion transmitting cable assembly 10 includes a push/pull cable 12 having a flexible outer sheath or conduit 14 and a flexible inner core 16 longitudinally slidable within the conduit 14, first and second core attachments 18, 18' secured to ends of the core 16, first and second conduit abutment fittings or end fittings 20, 20' secured to ends of the conduit 14, and first and second guide tubes 22, 22' extending from the conduit abutment fittings 20, 20' and slidably receiving the core attachments 18, 18' therein.

In automotive push-pull applications, the conduit 14 typically includes an interior thermoplastic tube or liner. The liner forms the inside diameter or passage of the conduit 14. Exterior to the liner, a reinforcing element, such as a plurality of metal wires helically wrapped about the liner, is typically provided to add strength to the thermoplastic liner. The reinforcing element gives added strength for the compression and tension loads seen in push-pull applications. After the reinforcing element is applied about the liner, an outer coating or jacket of flexible thermoplastic material is typically applied to hold the reinforcement member in relation to the liner and fully encapsulate the sub-assembly. The outer coating is typically applied through a high temperature extrusion process. Through extrusion, an outside diameter is formed around the sub-assembly and the conduit 14 can be cut to a desired length. It is noted that the conduit 14 can have any other suitable construction and/or can comprise any other suitable materials within the scope of the present invention. For example, the conduit 14 can be constructed to eliminate the use of metal so that the conduit 14 is constructed entirely of non-metallic materials.

The core 16 typically consists of a strand assembly made up of metal wire. The metal wires are wound in different configurations depending upon the application. In automotive push-pull applications, the core 16 typically has a center wire or a small wire bundle. To strengthen the center wire, a reinforcing element is provided such as, for example, a plurality of outer wires or wire bundles, helically wound around the center wire. As with the reinforcing element for the conduit liner, the reinforcing element for the core 16 provides support for the center wire. It is noted that the core 16 can have any other suitable construction and/or can comprise any other suitable materials within the scope of the present invention. For example, the core 16 can be constructed to eliminate the use of metal so that the core 16 is constructed entirely of non-metallic materials.

A first end of the conduit 14 is secured to the first conduit abutment fitting 20 and the first guide tube 22 extends from the forward end of the first conduit abutment fitting 20. The illustrated first guide tube 22 is of a swivel-type guide tube as described in more detail hereinafter. A first end of the core 16 extends longitudinally out of the first open end of the conduit 14 and partially through the first conduit abutment fitting 20 and is rigidly connected to the first core attachment 18 within the first guide tube 22. The first core attachment 18 is slidably received within the first guide tube 22 for sliding longitudinal movement therein. The illustrated first core attachment 18 is adapted to be operatively connected to a connection pin of control member such as, for example, a transmission lever. It is noted that the first core attachment 22 can alternatively be adapted to be connected to the control member in any other suitable manner and/or to any other suitable type of control member.

A second open end of the conduit 14 is secured to the second conduit abutment fitting 20' and the second guide tube 22' extends from the forward end of the second conduit abutment fitting 20'. The illustrated second guide tube 22' is of the swivel-type tube as described in more detail hereinafter. A first end of the core 16 extends longitudinally out of the second open end of the conduit 14 and partially through the second conduit abutment fitting 20' and is rigidly connected to the second core attachment 18' within the second guide tube 22'. The second core attachment 18' is slidably received within the second guide tube 22' for sliding longitudinal movement therein. The illustrated second core attachment 18' is adapted to be operatively connected to a second connection pin of second control member such as, for example, a shifter lever. It is noted that the second core attachment 18' can alternatively be adapted to be connected to the second control member in any other suitable manner and/or to any other suitable type of control member.

In operation, movement of the shifter lever by the operator moves the second core attachment 18' to push or pull the core 16. The longitudinal movement of the core 16 within the conduit 14 pushes or pulls the first core attachment 18 to operate the transmission lever to change gears in a desired manner. The core attachments 18, 18' longitudinally move within the guide tubes 22, 22' to define a linear line of force as the core attachments 18, 18' are actuated to axially move within the guide tubes 22, 22'. Thus, longitudinal movement of the core 16 and the core attachments 18, 18' actuates the control members. The flexible conduit and core 14, 16 allow the cable 12 to be routed along a desired path, which is typically not linear. The illustrated swivel-type guide tubes 22, 22' can pivot to allow the orientation of the core attachments 18, 18' relative to the conduit abutment fittings 20, 20' to account for rotational motion of the control members.

The illustrated first and second conduit abutment fittings 20, 20' each include a main body 24, 24' and the guide tubes 22, 22' each forwardly extend from the main body 24, 24'. The illustrated conduit abutment fittings 20, 26' are each adapted to be secured to stationary mounting brackets to form stationary locations for the ends of the conduit 14. The illustrated guide tubes 22, 22' are each secured to the conduit abutment fittings 20, 20' with a ball and socket or swivel joint 26, 26' (FIGS. 2A and 2B) so that the guide tubes 22, 22' can pivot relative to the conduit abutment fittings 20, 20'. The illustrated first conduit abutment fitting 20 is of the type which has a socket 28 formed therein and is assembled with the guide tube 22 and has a retainer or lock cap 30 which holds the assembly together. The illustrated second conduit abutment fitting 20' is of the type which is over-molded onto the guide tube 22' to form the socket 28. It is noted that the conduit abutment fitting assemblies 20, 20' can be of any suitable type depending of the requirements of the application. Because the ends of the illustrated cable assembly 10 are substantially the same with respect to the remaining description, only the first end will be described in detail hereinafter.

The illustrated guide tube 22 is generally tubular-shaped having a generally cylindrical-shaped outer surface and a longitudinally extending central opening or passage 32. At least a forward portion of the passage 32 is sized and shaped for close sliding receipt of the core attachment 18 therein. The rearward end of the passage 32 is preferably expanded to eliminate sharp edges which may abrade the core 16 which passes into the rearward end of the passage 32. The rearward end of the illustrated guide tube 22 is provided with a generally spherical-shaped ball 34. The ball 34 is sized and shaped for receipt within the internal socket 31 of the conduit abutment fitting 20 to form the ball and socket type swivel joint 26, it is noted that the ball and socket joint 26 can be adapted to be a drop-in, push-in, snap-over, or molded-over type connection as desired. The guide tube 22 is preferably adapted to have a pull-off load of at least 180 N to 650 N at 20 degrees C. and preferably has an articulation angle of at least 7 degrees in all directions with an articulation force of no more than 4.5 N.

The illustrated guide tube 22 is constructed of two separate and distinct components that are longitudinally secured together during assembly of the cable assembly 10 as described in more detail hereinafter. The illustrated guide tube 22 includes a main member 36 secured to and forwardly extending from the conduit abutment fitting 20 and an extension member 38 secured to and forwardly extending from the main member 36. The guide tube members 36, 38 are preferably sized so that the guide tube 22 covers the rearward end of the core attachment 18 throughout its entire stroke of axial movement, that is, there is an overlap between the guide tube 22 and the core attachment 18 when the core attachment 18 is at its outermost or extended position (best shown in FIG. 3).

The main member 36 forms the rear end of the guide tube 22 and is generally tubular-shaped having a generally cylindrical-shaped outer surface and a rearward portion of the longitudinally extending central opening or passage 32 extends therethrough. The main member 36 has the ball 34 formed at the rear end thereof. The main member 36 is preferably of unitary construction and a separate component from the extension member 38 and is preferably molded of a plastic material but any other suitable material can be alternatively utilized.

The extension member 38 forms the forward end of the guide tube 20 and is generally tubular-shaped having a generally cylindrical-shaped outer surface and a forward portion of the longitudinally extending central opening or passage 32 extends therethrough. The rearward end of the extension portion 38 forms a socket or receptacle 40 for receiving the forward end of the main member 36. The receptacle 40 is sized and shaped to closely receive the forward end of the main portion with a friction fit connection to substantially prevent relative longitudinal movement between the main member 36 and the extension member 38 during operation. The extension member 38 is preferably removably connected to the main member 36. It is noted that the extension member 38 and the main member 36 can alternatively be secured together in any other suitable manner such as, for example with a snap lock connection. The extension member 38 is preferably of unitary construction and a separate component from the joint member 36 and is preferably molded of a plastic material but any other suitable material can be alternatively utilized.

Figure 3:
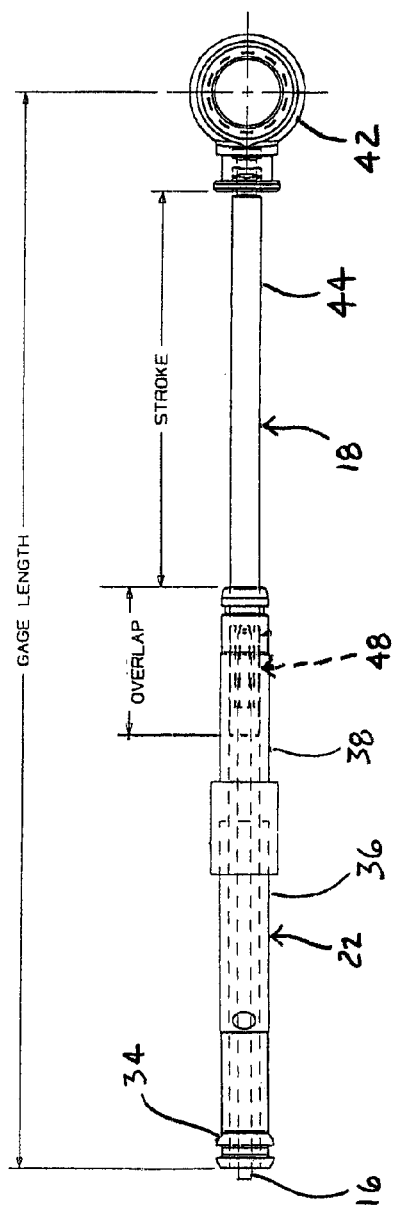
FIG. 3 is a side elevational view of a core attachment and a guide tube of the cable assembly of FIG. 1.
Figure 4:
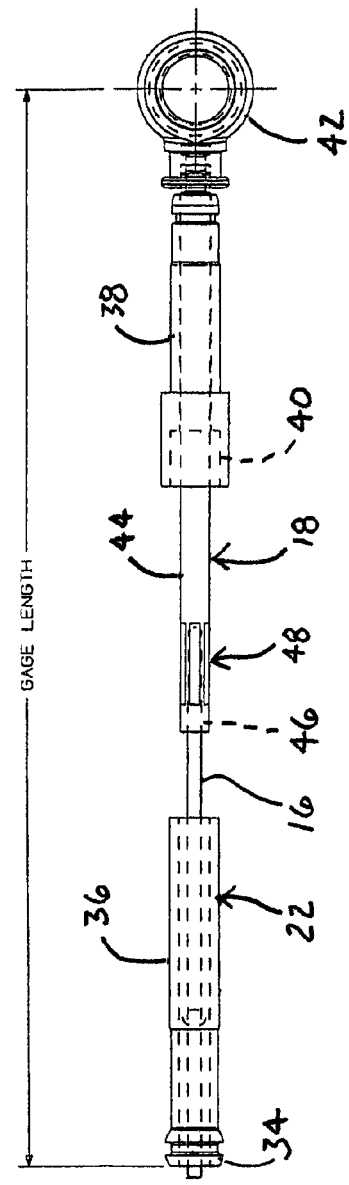
FIG. 4 is a side elevational view similar to FIG. 3 but wherein the guide tube is separated to expose the connection between the core and the core attachment.

As best shown in FIGS. 3 and 4, the illustrated core attachment 18 includes a terminal 42 and a rod 44 rearward extending from the terminal 42 and secured to the core 16. The terminal 42 is adapted to receive the connecting pin of the control member as is known in the art. The illustrated rod 44 is elongate and rearwardly extends from the terminal 42. The rod 44 is sized and shaped to be slidingly received within the passage 32 of the guide tube 22. The illustrated rod 44 is generally circular in cross-section to cooperate with the illustrated passage 32 which is also generally circular in cross-section. It is noted that the rod 44 and the passage 32 can alternatively have any other suitable shape.

The terminal and rod 42, 44 can be constructed as separate components and secured together. For example, the rod 44 can be formed of metal and the terminal 42 can be formed of a plastic material attached or over-molded onto the forward end of the rod 44. Alternatively, the terminal and rod 42, 44 can be formed of unitary or one-piece, construction and molded of a plastic material but any other suitable material can be alternatively utilized. For example, see U.S. patent application Ser. No. 11/849,700 filed on Sep. 4, 2007, the disclosure of which is expressly incorporated herein in its entirety.

The core 16 extends out of the conduit 18 and through the passage 32 to the core attachment where the core 16 is secured to the rear end of the core attachment rod 44 within the guide tube 22. The illustrated rod 44 is provided with an opening 46 at its rear end for receiving the core 16 and the rod 46 is crimped to the core 16 at the opening 46 to form a rigid joint 48 therebetween. It is noted that the core 16 can alternatively be secured to the core attachment 18 in any other suitable manner. The first core attachment 18 (which is the transmission end outside the vehicle) is preferably adapted to withstand a tension load of at least 667 N at 149 degrees C. and compression load of at least 338.8 N at 149 degrees C. The second core attachment 18' (which is the shifter end inside the vehicle) is preferably adapted to withstand a tension load of at least 667 N at 82 degrees C. and compression load of at least 338.8 N at 82 degrees C.

The cable assembly 10 is preferably assembled by securing the end of the conduit 14 to the conduit abutment fitting 20, extending the core attachment 18 through the extension member 38 of the guide tube 22, and extending the core 16 through the conduit 14 and through main portion 38 of the guide tube 22. If not already separated, the extension member 38 is separated from the main member 36 by forwardly sliding the extension member 38 forward along the core attachment rod 44 to expose the end of the core attachment rod 44 so that the end of the core attachment rod 44 can be joined to the core 16. The core 16 is then joined to the end of the core attachment rod 44 by crimping or other suitable means. Once the core 16 is joined to the core attachment rod 44, the extension member 38 is rearwardly moved along the core attachment rod 44 to the main member 36 and snapped onto the main member 36 to cover the joint 48 between the core 16 and the core attachment 18.

The guide tube 22 and the core attachment 18 are preferably sized so that the end of the core attachment, including the entire joint 48, is located within the guide tube over an entire stroke of the core attachment.

It is apparent from the foregoing disclosure that the present invention enables cable assemblies to have longer guide tubes for supporting load on the rod ends while still being able to stake the rod to the core. This provides a more durable design and increased support for long rods on assemblies with long gage lengths. Additionally, the present invention enables the use of a shorter gage length (total length of the guide tube and the core attachment when in its extended position) while keeping stroke length (distance the core attachment is movable relative to the guide tube) at a maximum. Furthermore, the present invention enables increased overlap between the guide tube and the rod. The increased overlap eliminates problems due to strand tolerance and the rod coming out of the end of the guide tube.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method of assembling a motion transmitting cable assembly comprising the steps of, in combination:

securing an end of a conduit to a conduit abutment fitting;

providing a guide tube comprising a main member secured to the conduit abutment fitting and a separate extension member connectable to the main member for longitudinally extending from the main portion opposite the conduit abutment fitting;

extending a rod of a core attachment into and through the extension portion of the guide tube;

extending a core through the conduit, through the conduit abutment fitting, and into and through the main member of the guide tube;

joining and end of the core extending from the main member of the guide tube to an end of the rod of the core attachment extending from the extension portion of the guide tube; and securing the extension portion of the guide tube to the main portion of the guide tube to extend the length of the guide tube and cover the joint between the core and rod of the core attachment with the extension portion of the guide tube so that the core and the rod of the core attachment longitudinally move relative to and within the extension portion of the guide tube when the core is longitudinally moved relative to and within the conduit and the conduit end fitting.

2. The method according to claim 1, further comprising the step of sizing the core attachment and the guide tube so that the end of the rod of the core attachment joined to the core is located within the guide tube over an entire stroke of the core attachment.

3. The method according to claim 1, wherein the rod of the core attachment is a metal rod and wherein the step of joining the core to the rod of the core attachment includes the step of crimping the metal rod to the core.

4. The method according to claim 1, wherein the step of securing the extension portion to the main portion comprises the step of removably securing the extension portion to the main portion.

5. The method according to claim 4, wherein the step of removably securing the extension portion to the main member comprises the step of providing one of the main member and the extension member with a socket for removably receiving the other of the main portion and the extension portion.

6. The method according to claim 1, wherein the extension portion of the guide tube is secured to the main portion of the guide tube to prevent relative longitudinal movement therebetween as the core and the rod of the core attachment longitudinally move within the extension portion of the guide tube when the core is longitudinally moved relative to and within the conduit and the conduit end fitting.

* * * * *